(12) United States Patent
Solacolu

(10) Patent No.: US 9,677,686 B2
(45) Date of Patent: Jun. 13, 2017

(54) CONTROL PROCESS FOR OPERATION OF VALVES OF A GAS SUPPLY DEVICE OF THE GAS TURBINE

(71) Applicant: GE ENERGY PRODUCTS FRANCE SNC, Belfort (FR)

(72) Inventor: Christian-Anghel Solacolu, Bavilliers (FR)

(73) Assignee: General Electric Company, Schenectady, NY (US)

( * ) Notice: Subject to any disclaimer, the term of this patent is extended or adjusted under 35 U.S.C. 154(b) by 84 days.

(21) Appl. No.: 14/708,968

(22) Filed: May 11, 2015

(65) Prior Publication Data

US 2016/0069476 A1    Mar. 10, 2016

(51) Int. Cl.

| F17D 3/00 | (2006.01) |
|---|---|
| F16K 37/00 | (2006.01) |
| F02C 7/228 | (2006.01) |
| F02C 7/232 | (2006.01) |

(52) U.S. Cl.
CPC .......... F16K 37/0083 (2013.01); F02C 7/228 (2013.01); F02C 7/232 (2013.01); F05D 2260/80 (2013.01); F05D 2260/83 (2013.01); F05D 2270/306 (2013.01)

(58) Field of Classification Search
CPC .. F02C 7/228; F02C 7/232; F02C 9/28; F23N 1/002; F16K 37/0083
USPC .... 137/599.05, 599.06, 613, 614.11, 614.13, 137/861, 862, 870
See application file for complete search history.

(56) References Cited

U.S. PATENT DOCUMENTS

| 6,092,362 A * | 7/2000 | Nagafuchi | F02C 9/34 60/39.281 |
|---|---|---|---|
| 6,209,310 B1 * | 4/2001 | Kuenzi | F02C 3/30 60/39.281 |
| 6,880,325 B2 * | 4/2005 | Aoyama | F02C 7/228 60/39.37 |
| 7,441,398 B2 * | 10/2008 | Ziminsky | F02C 7/222 60/39.281 |
| 7,549,293 B2 * | 6/2009 | Gallagher | F02C 9/28 60/39.281 |
| 7,644,574 B2 * | 1/2010 | Feiz | F02C 9/28 60/39.281 |
| 8,261,529 B2 * | 9/2012 | Koizumi | F02C 3/22 60/39.463 |
| 8,276,385 B2 | 10/2012 | Zuo | |
| 8,666,632 B2 * | 3/2014 | Zebrowski | F02C 7/228 60/745 |
| 8,915,059 B2 * | 12/2014 | Rentala | F02C 7/228 60/39.281 |
| 2003/0037536 A1 * | 2/2003 | Aoyama | F02C 7/228 60/39.281 |

(Continued)

*Primary Examiner* — Reinaldo Sanchez-Medina
(74) *Attorney, Agent, or Firm* — Ernest G. Cusick; Frank A. Landgraff

(57) ABSTRACT

A gas supply system of a gas turbine and a method for controlling an operation of the gas supply system. A gas supply system includes a first valve connected in series to a set of second valves that are in parallel with each other. At least one second valve from the set of second valves is connected to a combustion chamber of the gas turbine. A degree of opening of the first valve and the at least one second valve is changed to in a manner that controls a total mass flow of gas output by the set of second valves during the change in the degree of opening.

6 Claims, 1 Drawing Sheet

(56) References Cited

U.S. PATENT DOCUMENTS

| | | | |
|---|---|---|---|
| 2008/0016875 A1* | 1/2008 | Ryan | F02C 7/26 60/776 |
| 2010/0122535 A1* | 5/2010 | Finkbeiner | F02C 7/22 60/734 |
| 2013/0074510 A1 | 3/2013 | Berry | |
| 2013/0327402 A1* | 12/2013 | Usenko | F02C 7/232 137/1 |

* cited by examiner

CONTROL PROCESS FOR OPERATION OF VALVES OF A GAS SUPPLY DEVICE OF THE GAS TURBINE

CROSS-REFERENCE TO RELATED APPLICATIONS

The present disclosure claims priority to French application Serial No. 14 522 034, filed on Mar. 12, 2014.

BACKGROUND OF THE DISCLOSURE

The present disclosure provides a control process for operation of at least one valve of a gas supply system for a gas turbine and, in particular, a process allowing partial stroke tests. The present disclosure further provides a system for implementing this control process.

Gas supply systems are used in various industrial processes, such as for gas turbines. Gas supply systems for gas turbines are fitted with shut down devices that allow emergency stopping of a gas supply in order to ensure safety and/or maintenance. These shut down devices are generally rapid closure isolation valves that remain open or under control in normal operation. Regular tests on these isolation valves are necessary, as such valves tend to seize, which can lead to reliability problems during an emergency shutdown.

One method of testing these valves includes completely disconnecting the supply system from the gas turbines and executing a compete valve test. Alternatively, one can run partial stroke tests on the isolation valves in order to check their operation without disconnecting the supply system. Partial stroke tests (PST for "partial stroke test" in English) allow an operator to detect failures of a valve such as seizure or a mechanical blocking of the valve. These partial stroke tests allow the operator to increase the amount of time between complete valve tests, thereby increasing the period between the maintenance stops.

Various on-line tests on isolation valves have been proposed that prevent completely disconnecting the gas supply system. For example, in one partial closure test system on an isolation valve, a stroke of the valve is positioned in a predetermined intermediate position between a normal position and an emergency stop position. Such a partial closure test system can detect a loss of electric signal for controlling the valve and detect correct operation of the valve, such as by measuring a fluid pressure which controls an actuator.

Another method includes executing an on-line partial stroke test for an isolation valve. In addition to the isolation valve being tested, the gas supply system uses a second control and second isolation valve. The system includes a piping branch to bypass the isolation valve being tested in order to execute a complete closure test on the isolation valve being tested without disturbing the gas supply.

Partial closure on a line can cause transient phenomena, which creates disturbances upstream of the injectors of the gas turbine combustion chamber. These disturbances can disturb the turbine power level.

SUMMARY OF THE DISCLOSURE

The present disclosure provides a partial stroke test that overcomes the problems stated above and prevents the use of a piping branch while controlling a turbine capacity.

The present disclosure provides a control process for operation of at least one valve of a gas supply system of a gas turbine. The gas supply system includes a first valve on a gas supply line, the first valve being connected in series via a pipe to a set of one or more second valves which are placed in parallel with each other. Each of the second valves is connected to a gas turbine combustion chamber and, in particular, to injectors in each gas turbine combustion chamber. The gas supply system further includes a control system for controlling operation of each of the first valve and the one or more second valves.

A method according to the present disclosure includes a valve opening step consisting of partial opening of the first valve and at least a second valve. A degree of opening of each valve is set so as to control the total mass flow of gas from all the second valves. The control system controls the operation of the first valve and/or at least a second valve.

The valve testing process disclosed herein maintains a mass flow of gas introduced by the injectors in the turbine combustion chambers, and thus maintains a turbine capacity during the test. The first and the second valves, held in a partially open position, can be tested simultaneously, without the turbine capacity being affected. Additionally, the method disclosed herein can be performed without the presence of branch circuits.

The degree of opening (or "valve opening") of each valve can be set so that the total mass flow of gas from all the second valves is between a predetermined lesser value and a predetermined greater value. In particular, the degree of opening of each valve can be set so that the total mass flow is equal to a predetermined constant value.

At the start of the opening of the valves (i.e., in a first phase), the degree of opening of the first valve can be reduced and a degree of opening of a second valve can be increased in a manner that reduces a pressure in a pipe located between the first valve and the second valve. In one embodiment, in a normal operation before the starting of the process, the second valves may not be completely opened, thereby allowing that their degree of opening can be increased during the testing process.

A change in the degree of opening of the first valve with time includes a first phase of reducing the opening, then a second stationary phase followed by a third phase of increasing the opening. A change in the degree of opening of the second valve with time includes a first phase of increasing the opening, then a second stationary phase followed by a third phase of reducing the opening. The control system of each first and second valve is capable of determining if a valve is seized and/or blocked.

The present disclosure also provides a gas turbine gas supply system, allowing implementation of a process described above. The system includes a first valve connected (via a pipe) in series with a set of one or more second valves which are in parallel with each other. The pipe connects at one end to the first valve and at the other end to each of the second valves. Each second valve is connected to at least one gas turbine combustion chamber, particularly via gas turbine injectors. The system further includes a control system for controlling the operation of the first valve and the second valves. The control system is capable of controlling partial opening of the first valve and at least one second valve. The control system is capable of setting the degree of opening of each valve in a manner so as to control a total mass flow of gas from all the second valves. The control system is capable of controlling the operation of the first valve and/or at least one second valve during the partial opening of these valves. The degree of opening of each valve can be set in a manner so that the total volumetric flow of gas from all the second valves is equal to a predetermined constant value.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION OF THE DISCLOSURE

Figure 1:
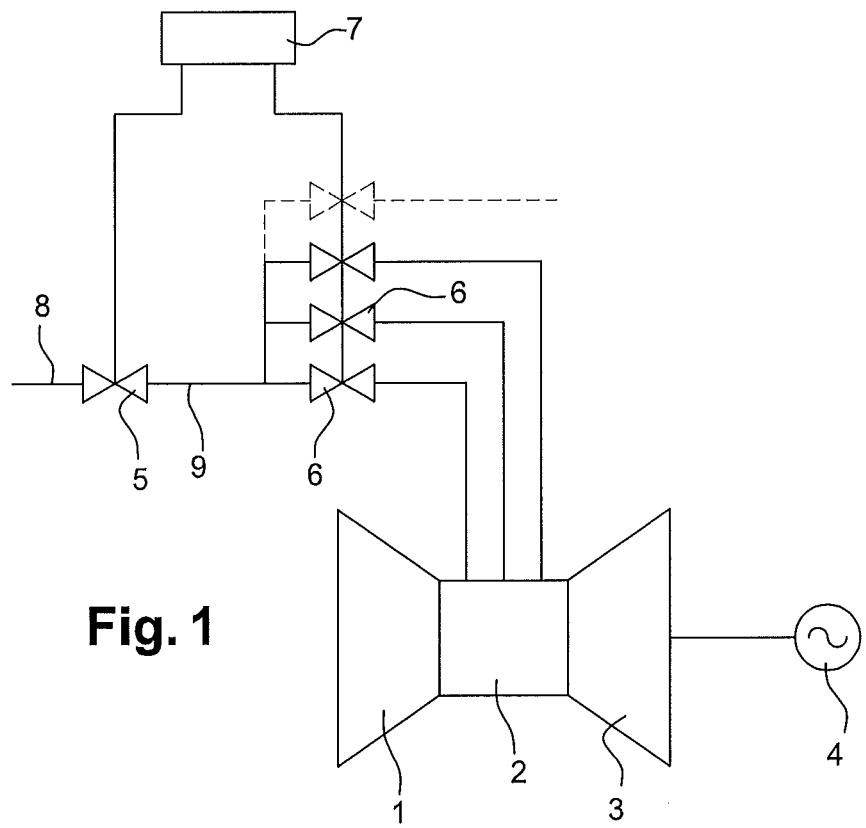
FIG. 1 schematically illustrates a gas supply system for a gas turbine suitable for implementing the process described herein according to one embodiment of the disclosure.

FIG. 1 shows an exemplary embodiment of a gas turbine supply system suitable for implementing the method described herein. As illustrated in FIG. 1, a gas turbine 3 is supplied fuel by the gas turbine supply system. A compressor 1, constituted of a set of fixed (stator) and mobile (rotor) blades, compresses external air. Gaseous fuel is injected in one or more combustion chambers 2 via injectors (not shown) where the fuel is mixed with the compressed air to maintain continuous combustion in the one or more combustion chambers 2.

Hot gases from the combustion chambers 2 pass through the turbine 3, where the thermal and kinetic energy from the hot gases is transformed into mechanical energy. Turbine 3 includes one or more wheels fitted with blades for translating the energy of the gases into a rotation movement. The rotation movement of the turbine 3 is communicated to a shaft which activates compressor 1 at one end, and generator 4, such as an alternator, at the other end.

The gas supply system provides fuel to the combustion chamber 2. The gas supply system includes a gas supply line 8 on which is placed a first valve 5. The first valve 5 is generally an SRV valve ("Stop Speed/Ratio Valve") and is used to quickly stop the gas supply to the turbine 3 and specifically to the combustion chamber 2. The first valve 5 controls a mass flow of gas to ensure a pressure (P2) which is constant in the pipe 9 downstream of the valve 5.

On the pipe 9 is placed a set of one of more second valves 6 fitted in parallel with each other. Second valves 6 are generally GCV valves ("Gas Control Valve") and are intended to directly control the load (capacity) of turbine 3, independent of the gas supply pressure (P2) upstream of the second valves 6. The gas supply pressure is generally constant during normal operation and is controlled by the opening of the first valve 5. Several second valves 6 are generally used in order to reduce nitrogen oxide and carbon monoxide emissions at the turbine 3.

The gas supply system 10 further includes a control system 7 for opening the first valve 5 and second valves 6. The control system 7 also allows controlling the operation of the valves 5 and 6 to check that the valves 5 and 6 open well and are not seized. The control system 7 receives a signal corresponding to the position of the valves 5 and 6. Verification of the valve stroke is carried out by continuous measurement during the valve opening position test. A signal is sent to the control system 7 when the final position of the valve is different from the predetermined value defined by the test.

Figure 2:
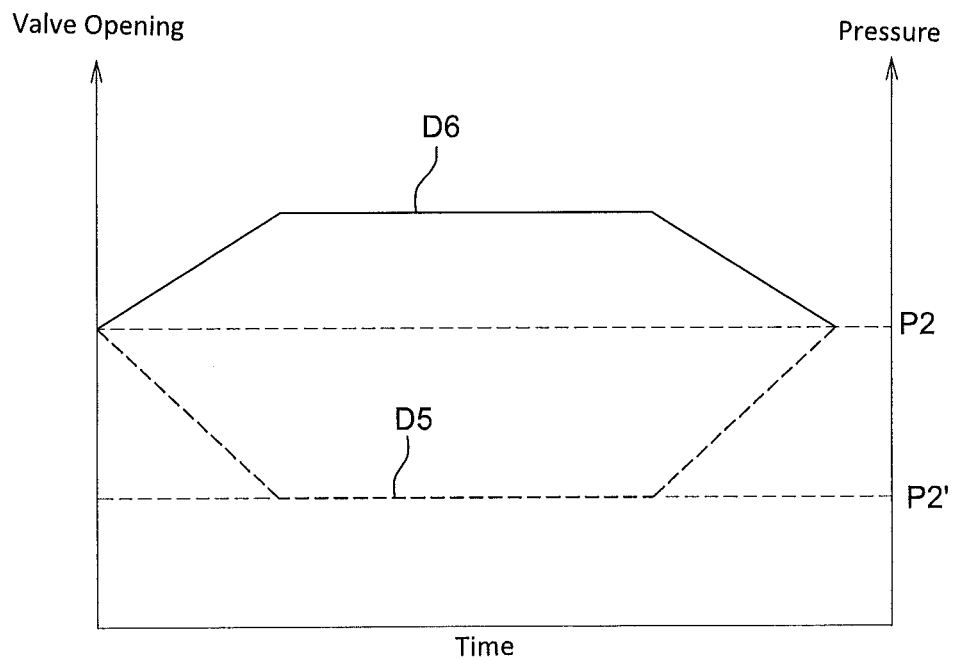
FIG. 2 shows a diagram illustrating the testing process of the disclosure.

FIG. 2 illustrates a change of a degree of opening ("valve opening") D5 of the first valve 5 and a degree of opening D6 of a second valve 6 with time during the valve testing process. FIG. 2 also shows a change with time of pressure in the pipe 9.

At the start of the test process (i.e., during a first phase), the control system 7 controls a fall in reference pressure in the pipe 9 from an initial pressure P2 to a second pressure P2'. In the first phase, the control system partially closes first valve 5 and partially opens at least one of the second valves 6 so as to maintain a constant mass flow of gas to the combustion chamber 2 during the first phase, thereby maintaining the turbine capacity at a constant level during the testing process. The increase and decrease in the degree of opening of valves 5 and 6, respectively, can be linear with time. During a second phase, the degree of opening D5 of the first valve 5 and the degree of opening D6 of the second valves 6 remain constant. Finally, in a third phase, the control system 7 controls an increase in pressure in the pipe 9 back to its initial value P2. During the third phase, the degree of opening of the first valve 5 is increased and the degree of the opening of the second valves 6 is decreased or reduced, while maintaining constant mass flow of gas to the combustion chamber 2.

During normal operation of the gas supply system, (i.e. outside of the testing process described herein) the pressure P2 in pipe 9 between the first valve 5 and the second valves 6 is a predetermined constant value. This imposed value determines the degree of opening for the first valve 5.

During the first phase of the testing process, the pressure value is modified from P2 so as to attain a value P2'. The degree of opening D5 of the first valve 5 is varied with time with a slow slope in order not to create harmful transient phenomena in the pressure in pipe 9 or to reduce the appearance of such transient phenomena. The control system 7 simultaneously modifies the opening of the second valves 6 to preserve the initial turbine capacity. During the second stage, pressure in pipe 9 is maintained at P2'. At the end of the third stage of the testing process, the pressure in the pipe 9 is again equal to the initial pressure value P2.

Therefore, in one aspect the present disclosure provides a method for controlling an operation of a gas supply system of a gas turbine, the method including: providing a gas supply and a first valve connected in series to a set of second valves placed in parallel with each other, wherein at least one second valve from the set of second valves is connected to a combustion chamber of the gas turbine; and changing a degree of opening of the first valve and the at least one second valve in a manner that controls a total mass flow of gas output by the set of second valves during the changing operation. The degree of opening of each of the first valve and the at least one second valve can be changed so as to maintain the total mass flow of gas by the set of second valves equal to a predetermined constant value. Changing the opening the first valve and the at least one second valve can include reducing a degree of opening of the first valve and increasing a degree of opening of the at least one second valve during a first phase so as to reduce a pressure in a pipe located between the first valve and the set of second valves. The degree of opening of the first valve is generally characterized by: decreasing with the time during the first phase, being constant during a second phase, and increasing with time during a third phase. The degree of opening of the at least one second valve with the time is generally characterized by: increasing with time during the first phase, being constant during the second phase, and decreasing with time during the third phase. A control system can be used to determine whether either of the first valve and the at least one second valve is at least one of seized and blocked.

In another aspect, the present disclosure provides a gas turbine supply system, including: a first valve; a set of second valves placed in parallel with each other, wherein the first valve is in series with the set of second valves and wherein a second valve selected from the set of second valves is connected to a combustion chamber of a gas turbine; and a control system in communication with the first valve and at least one second valve, the control system configured to: change a degree of opening of the first valve and the at least one second valve to control a total mass flow of gas from the set of second valves. The control system maintains a total mass flow of gas output by the set of second valves equal to a predetermined constant during changing the degree of opening of each of the first valve and the at least one second valve. The control system controls the first valve and the at least one second valve during a first phase by reducing a degree of opening of the first valve and increasing the degree of opening of the at least one second valve so as to reduce a pressure in a pipe located between the first valve and the set of second valves. The degree of opening of the first valve is generally characterized by: decreasing with the time during the first phase, being constant during a second phase, and increasing with time during a subsequent third phase. The degree of opening of the at least one second valve with the time is generally characterized by: increasing with time during the first phase, being constant during the second phase, and decreasing with time during the third phase. The control system determines whether either of the first valve and the at least one second valve is at least one of seized and blocked.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method for controlling an operation of a gas supply system of a gas turbine, the method comprising:
   providing a gas supply and a first valve connected in series to a set of second valves placed in parallel with each other, wherein at least one second valve from the set of second valves is connected to a combustion chamber of the gas turbine; and
   changing a degree of opening of the first valve and the at least one second valve so as to control a total mass flow of gas output by the set of second valves,
   wherein changing the degree of opening of the first valve and the at least one second valve further comprises linearly decreasing the degree of opening of the first valve and linearly increasing the degree of opening of the at least one second valve during a first phase so as to reduce a pressure in a pipe located between the first valve and the set of second valves;
   wherein the degree of opening of the first valve is characterized by: linearly decreasing with time during the first phase, being constant during a second phase, and linearly increasing with time during a third phase; and
   wherein the degree of opening of the at least one second valve with time is characterized by: linearly increasing with time during the first phase, being constant during the second phase, and linearly decreasing with time during the third phase.

2. The method according to claim 1, further comprising changing the degree of opening of the first valve and the at least one second valve so as to maintain the total mass flow of gas output by the set of second valves equal to a predetermined constant value.

3. The method according to claim 1, further comprising using a control system to determine whether either of the first valve and the at least one second valve is at least one of seized and blocked.

4. A gas turbine supply system, comprising:
   a first valve;
   a set of second valves placed in parallel with each other, wherein the first valve is in series with the set of second valves and at least one second valve selected from the set of second valves is connected to a combustion chamber of a gas turbine; and
   a control system in communication with the first valve and the at least one second valve, the control system configured to change a degree of opening of the first valve and the at least one second valve so as to control a total mass flow of gas output from the set of second valves,
   wherein the control system is further configured to change the degree of opening of the first valve and the at least one second valve during a first phase by linearly decreasing the degree of opening of the first valve and linearly increasing the degree of opening of the at least one second valve so as to reduce a pressure in a pipe located between the first valve and the set of second valves;
   wherein the degree of opening of the first valve is characterized by: linearly decreasing with time during the first phase, being constant during a second phase, and linearly increasing with time during a subsequent third phase; and
   wherein the degree of opening of the at least one second valve with time is characterized by: linearly increasing with time during the first phase, being constant during the second phase, and linearly decreasing with time during the third phase.

5. The gas turbine supply system according to claim 4, wherein the control system is further configured to maintain the total mass flow of gas output by the set of second valves equal to a predetermined constant value when changing the degree of opening of the first valve and the at least one second valve.

6. The gas turbine supply system according to one claim 4, wherein the control system is further configured to determine whether either of the first valve and the at least one second valve is at least one of seized and blocked.

* * * * *